No. 710,846. Patented Oct. 7, 1902.
J. M. DALLAS.
APPARATUS FOR OPERATING FARM MACHINES.
(Application filed Oct. 14, 1901.)
(No Model.)

Witnesses.
Robert Everett,
H. B. Keifer

Inventor:
James M. Dallas.
By James L. Norris.
Atty.

United States Patent Office.

JAMES M. DALLAS, OF NEW ORLEANS, LOUISIANA.

APPARATUS FOR OPERATING FARM-MACHINES.

SPECIFICATION forming part of Letters Patent No. 710,846, dated October 7, 1902.

Application filed October 14, 1901. Serial No. 78,601. (No model.)

*To all whom it may concern:*

Be it known that I, JAMES M. DALLAS, a citizen of the United States, residing at New Orleans, in the parish of Orleans and State of Louisiana, have invented new and useful Improvements in Apparatus for Operating Farm-Machines, of which the following is a specification.

This invention relates to certain new and useful improvements in apparatus for operating harrows, plows, mowers, reapers, grinding and other machines commonly employed in farmwork, and other machines of a like nature.

The invention aims to construct an apparatus used especially in connection with farming appliances, as above mentioned, which shall be adapted for dragging or moving the appliances to and fro singly or in series over the fields to be cultivated or harvested to thoroughly, economically, and quickly prepare, cultivate, or harvest a crop or perform any service that can be done by animals in connection with farming appliances, as above mentioned.

The invention further aims to construct an apparatus of the kind referred to to accomplish the work mentioned without the employment of many horses or mules and farm-hands that would be necessary for the character of work as is now required.

The invention further aims to construct an apparatus for the purpose set forth which shall be extremely simple in its construction, strong, durable, efficient in its use, and comparatively inexpensive to set up; and to this end it consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1:
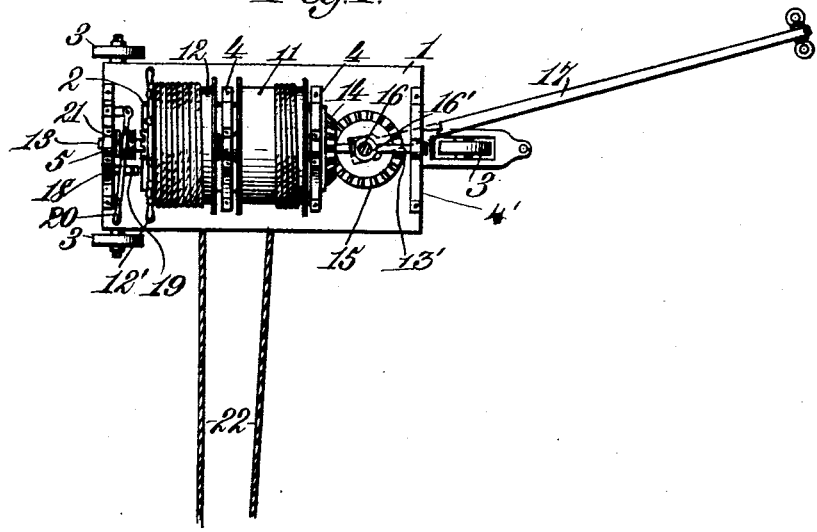
Figure 3:
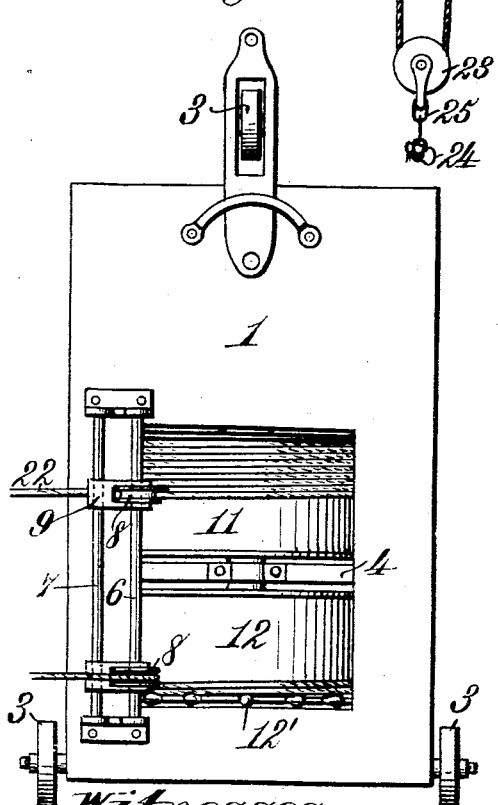
Figure 2:
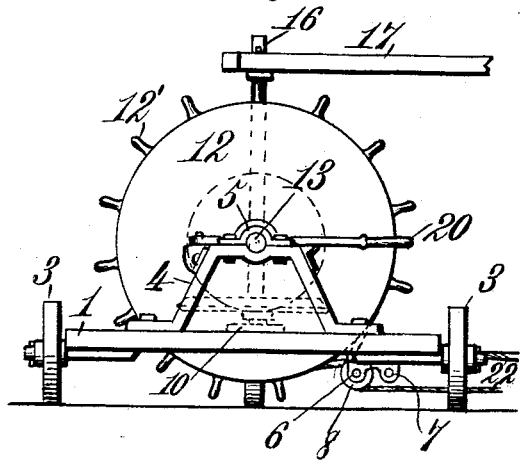

Figure 1 is a top plan of the apparatus; Fig. 2, an elevation, and Fig. 3 a bottom plan.

Referring to the drawings by reference-numerals, 1 denotes a base or platform constructed of any suitable material substantially rectangular in contour and provided with an opening 2. The base or platform 1 is elevated a suitable distance above the ground by means of a series of wheels 3, connected thereto in any desirable manner. These wheels 3 are preferably three in number, two of which are suitably arranged at the rear of the base or platform and the other at the front of the platform. Mounting of the base or platform 1 upon the wheels 3 permits of the former being portable, so that it can be moved to any point or position desired. The upper face of the base or platform 1 has secured thereto a series of upwardly-extending bearing brackets or standards 4, each provided at its top with a bearing-clamp 5. Extending longitudinally of the lower face of the base or platform 1 is a pair of hanger-rods 6 7, these latter being suspended from the platform in any suitable manner. The rods 6 7 are adapted to loosely support a pair of pulleys 8, each of which is mounted in a suitable sheath 9. The rod 6 extends through the pulleys and sheaths, while the rod 7 extends only through the sheaths. The rods 6 7 permit the pulleys and sheaths to be moved to and fro longitudinally of the lower face of the base or platform 1.

The reference-numeral 10 denotes a bearing-collar secured to the upper face of the base or platform 1, near the forward end thereof.

The reference-numerals 11 12 denote a pair of drums or windlasses, which are supported upon the brackets or standards 4 by means of the shaft 13. The drum 11 is rigidly secured upon the said shaft 13, while the drum 12 is loosely mounted thereon. Both of the drums 11 12 are suspended upon the shaft 13 in such a manner as to extend above and within the opening 2 in the base 1 and above the sheathed pulleys. The shaft 13 extends from one end of the platform or base 1 to a bearing-sleeve 16', the latter retained in position by the arm 13', supported by the bracket 4'. The shaft 13 also carries a bevel-gear 14, which is adapted to mesh with a bevel-gear 15, secured to the lower end of a vertical shaft 16, extending through the sleeve 16' and mounted at its lower end in the bearing-collar 10 and connected at its upper end to a beam 17 for operating it, although the shaft 16 may be operated in any other desirable manner.

Secured to the rear bracket or standard 4 is an L-shaped bar 18, having one of its arms toothed, as at 19, for retaining the lever 20 in its adjusted position. The lever 20 is pivoted to the rear standard or bracket 4 and is collared, as at 21, to a clutch member which is rotatable with the shaft 13 and adapted to be engaged or coupled with the clutch member on the free drum 12 and cause the said drum 12 to revolve with the shaft 13 and simultaneously with the drum 11. The toothed arm 19 of the bar 18 is adapted to retain the lever 20 in its clutching or unclutched position, as above stated.

The reference-numeral 22 denotes the rope, chain, or cable, which is alternately wound and unwound upon the windlasses or drums 11 12. The rope, chain, or cable passes over the sheathed pulleys 8 and the conducting-pulley 23, the latter being secured in its desired position by means of the stake 24, carrying a link or chain 25, attached at its free end to the pulley 23. The sheathed pulleys 8, as before stated, are mounted loosely upon the rods 6 7 and have a longitudinal movement, so that the rope, chain, or cable will be fed properly to the drums or windlasses.

The operation of the apparatus is as follows: The conducting-pulley 23 is staked off at a proper distance and a plow or other appliance attached to the end of the rope which is attached to the drum 12, the latter being unclutched from the shaft 13, the shaft 15 or beam 17 is operated, imparting motion to the shaft 13 winding the rope upon the drum 11 and drawing the plow or other appliance to the pulley 23. At the pulley the plow or other appliance is reversed and attached to the rope, the drum 12 is clutched, the shaft 15 or beam 17 operated in a reverse direction, and the plow or other appliance is drawn back to the windlass or drum 12. Then the apparatus, including the conducting-pulley 23, is moved to the next section of land to be plowed or cultivated, as the case may be, and the foregoing operation repeated. In some cases the plow or other appliance when it has reached the conducting-pulley 23 is reversed and drawn to the drum or windlass 11. If so, it is not necessary to clutch the drum 12 or reverse the movement of the shaft 15 or beam 17.

It is thought that the many advantages of an apparatus of the character described for drawing farm appliances to and fro singly or in series over fields to be plowed, cultivated, or harvested, as the case may be, dispensing thereby with the employment of many horses or mules, overcoming thereby the tramping down of the crops or packing the soil, as well as dispensing with a large number of farm hands or laborers, can be readily understood from the foregoing description, taken in connection with the accompanying drawings, and it will also be noted that minor changes may be made in the details of construction without departing from the general spirit of my invention.

Having thus fully described my invention, what I claim as new, and desire to secure by Letters Patent, is—

1. In an apparatus of the class described, a base or platform provided with an opening, a pair of drums or windlasses supported upon the base or platform within said opening, a pair of rods suspended from said base or platform, a pair of longitudinally-sliding pulleys mounted upon said rods, a rope, chain or cable passing over said pulleys and winding and unwinding upon said drums or windlasses, a conducting-pulley carried by said rope, means for fastening said conducting-pulley in its desired position, and means connected with said drums or windlasses for operating them, causing thereby the operation of the rope, chain or cable.

2. In an apparatus of the character described, a base or platform provided with an opening, a shaft supported thereon, a fast and a loose drum or windlass mounted on said shaft and suspended within said opening, means for clutching the loose drum or windlass to said shaft, a pair of rods suspended from said base or platform, a pair of longitudinally-sliding sheathed pulleys mounted on said rods, a rope, chain or cable winding and unwinding upon said drums or windlasses, a conducting-pulley carried by said rope, chain or cable, and means connected with said shaft for operating the drums or windlasses.

3. In an apparatus of the character described, a portable base or platform, a vertical shaft mounted thereon, a pair of drums or windlasses supported upon said base or platform, means connected with said shaft and drum or windlass for operating the latter when said shaft is operated, a rope, chain or cable operating over said drums or windlasses, a pair of longitudinally-sliding pulleys for guiding said rope, chain or cable upon the drums or windlasses, and means depending from the lower face of said base or platform for supporting the said pulleys.

4. In an apparatus of the character described, a base or platform, a fast and a loose drum supported upon said base or platform, operating means for said drum, means for fastening said loose drum to have it operate in the same direction as the fast drum, a rope, chain or cable winding and unwinding upon said drums, a pair of sliding pulleys for guiding said rope, chain or cable upon the drums when the latter are operated, means depending from the under face of the base or platform for supporting the said sliding pulleys, a conducting-pulley carried by said rope, chain or cable, and means for securing said conducting-pulley in its adjusted position.

In testimony whereof I have hereunto set my hand in presence of two subscribing witnesses.

JAMES M. DALLAS.

Witnesses:
ROBT. L. MOULTON,
D. W. ELLIS.